United States Patent [19]

Ingham et al.

[11] Patent Number: 4,920,820
[45] Date of Patent: May 1, 1990

[54] VEHICLE STEERING CONTROL

[75] Inventors: David C. Ingham, Gresham; Delmar G. Schwab, Portland, both of Oreg.

[73] Assignee: Hyster Company, Portland, Oreg.

[21] Appl. No.: 787,270

[22] Filed: Oct. 15, 1985

[51] Int. Cl.⁵ .............................................. G05G 9/00
[52] U.S. Cl. .................. 74/491; 74/471 XY
[58] Field of Search ............ 74/523, 491, 504, 511 R, 74/471 XY

[56] References Cited

U.S. PATENT DOCUMENTS

| | | | |
|---|---|---|---|
| 2,885,163 | 5/1959 | DeHaven | 74/491 |
| 3,054,076 | 9/1962 | Treff | 74/511 |
| 3,382,733 | 5/1968 | Miller et al. | 74/491 |
| 4,069,720 | 1/1978 | Thor | 74/491 |
| 4,140,200 | 2/1979 | Tucek | 74/471 XY |
| 4,150,803 | 4/1979 | Fernandez | 74/491 |
| 4,476,954 | 10/1984 | Johnson et al. | 74/471 XY |

FOREIGN PATENT DOCUMENTS 731897 6/1955 United Kingdom ................ 74/491

OTHER PUBLICATIONS

IBM Technical Disclosure Bulletin, vol. 25, No. 8 Jan., 1983 C.S. Frye, Flexible Potentiometer Bracket.

Primary Examiner—Peter M. Cuomo
Attorney, Agent, or Firm—Tim A. Long

[57] ABSTRACT

The hand grip of a vehicle steering control rotates about an axis passing through the center of the wrist. Control input is by rotation of the forearm while forces exerted by the operator radially from or parallel to the axis of rotation do not cause control input. A transducer, sensing hand grip position, is restrained only in rotation and isolated from forces acting on the hand grip.

7 Claims, 2 Drawing Sheets

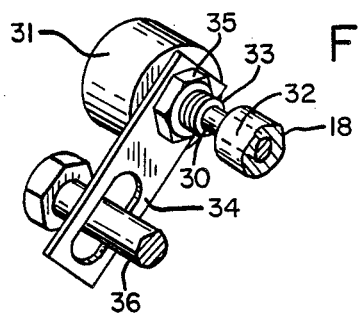
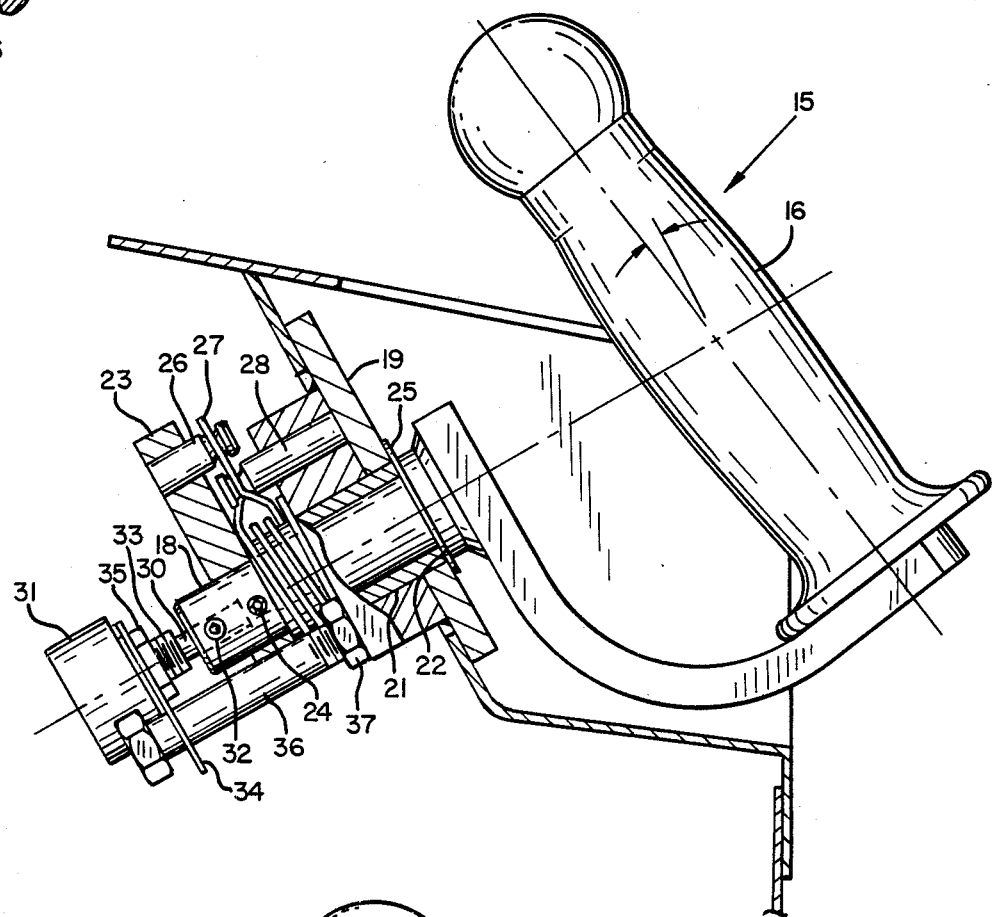
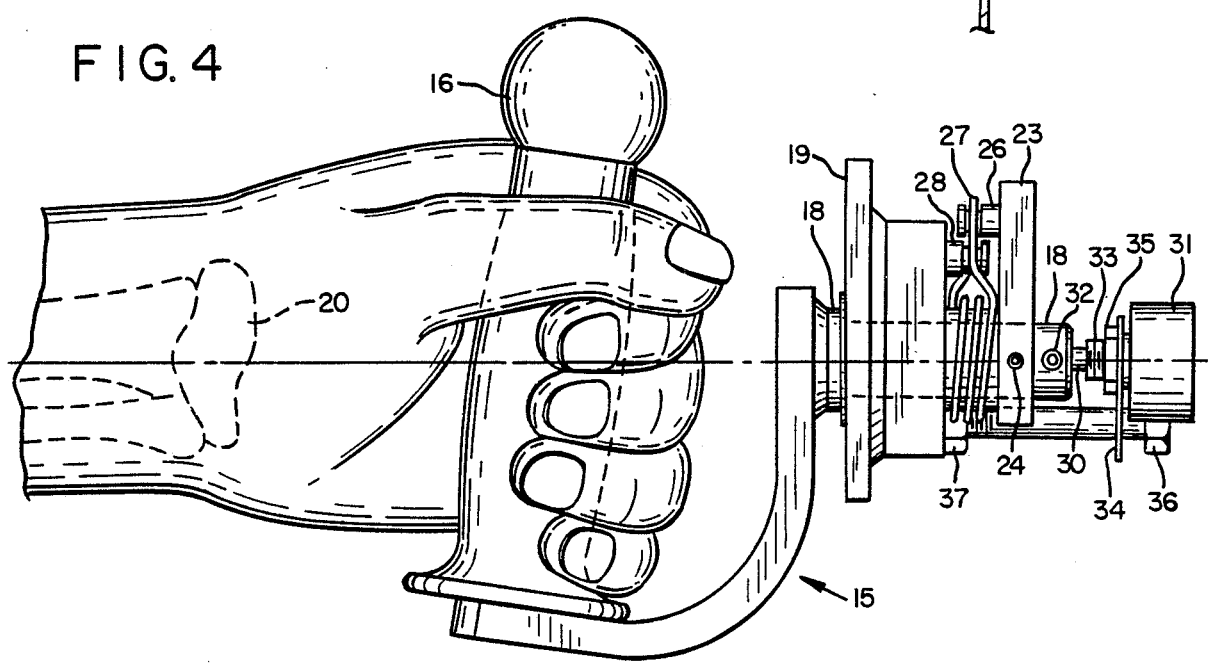

VEHICLE STEERING CONTROL

BACKGROUND OF THE INVENTION

1. Field of the Invention

The field of art to which this invention pertains includes operator controls for vehicles and, more specifically, a steering control for a vehicle.

2. Description of Related Art

The customary operator control device for steering wheeled vehicles is the steering wheel. The steering wheel provides a means of continuous operator input to the control and a means of amplifying operator input force, at the wheel rim, to the steering system. On some vehicles, such as certain lift trucks, limited space for mounting and operating a steering wheel and other considerations, make the use of a joy stick or lever advantageous as a steering control. Full power steering systems, with the vehicle steering system providing amplification of the force and motion of the operator control necessary to steer the vehicle, require that the operator exert only relatively small forces and limited motion necessary to drive a transducer, sensing control position.

A second function of continuous input control devices, such as the steering control, is the provision of support for the operator in resisting the forces acting on the body as a result of speed and direction changes of the vehicle. This is particularly important to the standing operator because of the height of the body's center of gravity and the lack of any secondary means of support, such as friction between the body and the seat.

All forces must be reacted through the arms which are engaged in the operation of the steering control and, on many vehicles, another device controlling speed of the vehicle's movement. The joy stick, as illustrated in U.S. Pat. No. 3,669,465, levers and steering wheels provide little support for the operator in the direction of intended control movement because the force required to actuate the control is kept purposely low and the point of application of force, the hand grip, is displaced from the axis about which the hand grip rotates. As a result, any attempt by the operator to stabilize the body may cause unintended vehicle movement.

The relatively high forces applied to the control by the operator makes it necessary to isolate these forces from the fragile transducer used to sense control position. Precision bearings and machined surfaces can be used to control relative movement of the transducer and the elements of the control engaged by the operator. A flexible mounting bracket; as illustrated in IBM Technical Bulletin, Volume 25, Number 8, January, 1983; provides a means of limiting forces on a rotary transducer, such as a potentiometer, subject to practical limitations for material thickness and bracket shape and size but imposes significant costs for low production quantities.

SUMMARY OF THE INVENTION

This invention provides a hand operated control for vehicle functions, particularly steering, requiring only limited space for mounting and operation and while requiring only relatively small forces for operation in the intended direction of control input, is capable of isolating relatively large forces exerted by the operator which would otherwise cause unintended vehicle movement or damage to the transducer sensing control position. This is accomplished by providing a control handle arranged for rotation on a handle shaft, the centerline of which, if extended, would pass through the center of the wrist in a direction generally parallel to the longitudinal centerline of the forearm, and by rigidly attaching the transducer shaft to the handle shaft while restraining its body only against rotation. The control handle can be rotated by rotation of the forearm requiring only the space necessary to rotate the hand, for operation. The force necessary to rotate the control is limited to the force necessary to rotate the transducer and overcome a spring means which returns the handle to the center position upon release. Forces exerted on the handle by the operator to resist movement of the body are tension or compression forces acting through the center of the wrist and are directed through the shaft centerline. These forces are reacted by the handle shaft bushing but do not create a force couple to rotate the control handle. The rigid coupling of the transducer shaft to the handle shaft causes the transducer shaft to move with the handle shaft, but since the body of the transducer is free to move in directions both radial and parallel to the centerline of the handle shaft, potentially harmful forces resulting from movement of the handle shaft are not transmitted to the bearings of the transducer.

A main object of this invention is to provide an improved steering control device for a vehicle. Further objects, features and advantages will be understood by persons skilled in the art when the following detailed description is reviewed in conjunction with the drawings.

BRIEF DESCRIPTION OF THE DRAWINGS

The invention is described below with reference to the accompanying drawings, where:

FIG. 3 is a partial section view of the steering control;

FIG. 4 is an alignment view of the steering control; and

FIG. 5 is a perspective, sectional view of the transducer mounting.

DETAILED DESCRIPTION OF THE PREFERRED EMBODIMENT

Figure 1:
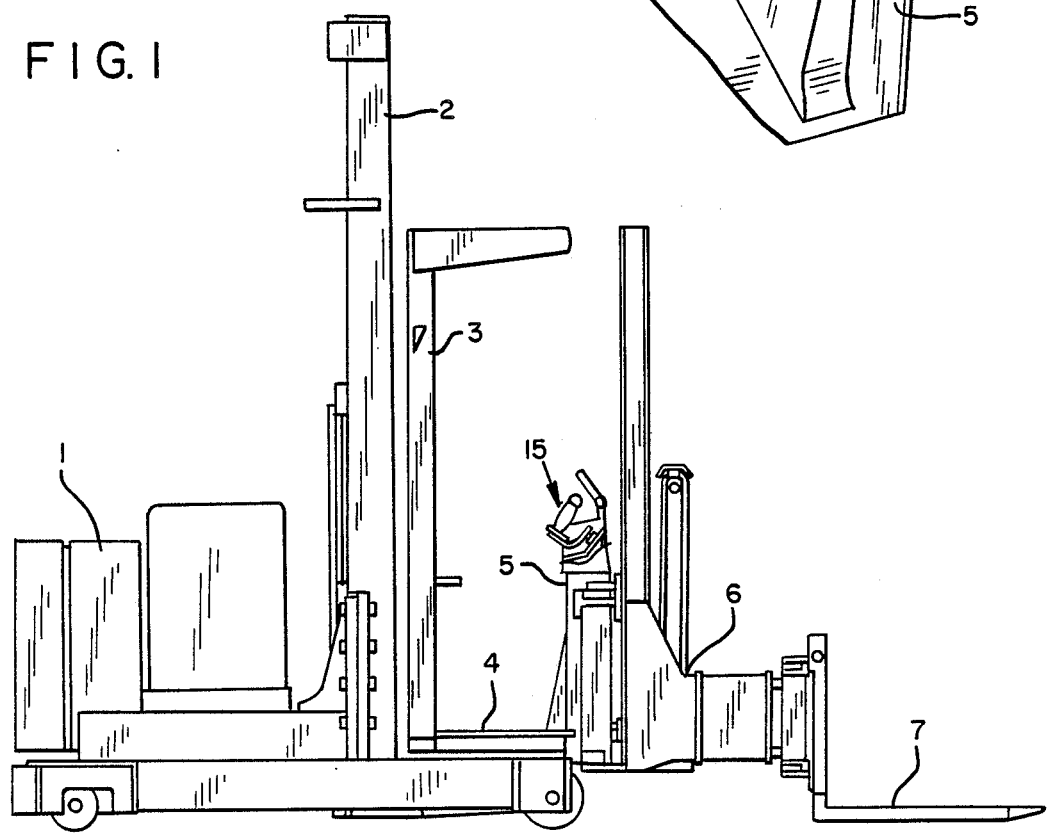
FIG. 1 shows a side view of a lift truck and its operator and control station.

A lift truck, having a chassis 1 and a mast assembly 2, is illustrated in FIG. 1. A carriage, comprising an operator station bounded by a rear structure 3, a floor 4 and a front structure 5, is arranged for vertical movement in the mast assembly. The lift truck illustrated is of a type intended for use in narrow aisles with loads to be handled arranged in racks on both sides of the aisle. A load handling attachment 6 having the capability of vertical and horizontal translation and lateral rotation of the forks 7, independent of movement of the carriage, is mounted on the front structure of the carriage.

Figure 2:
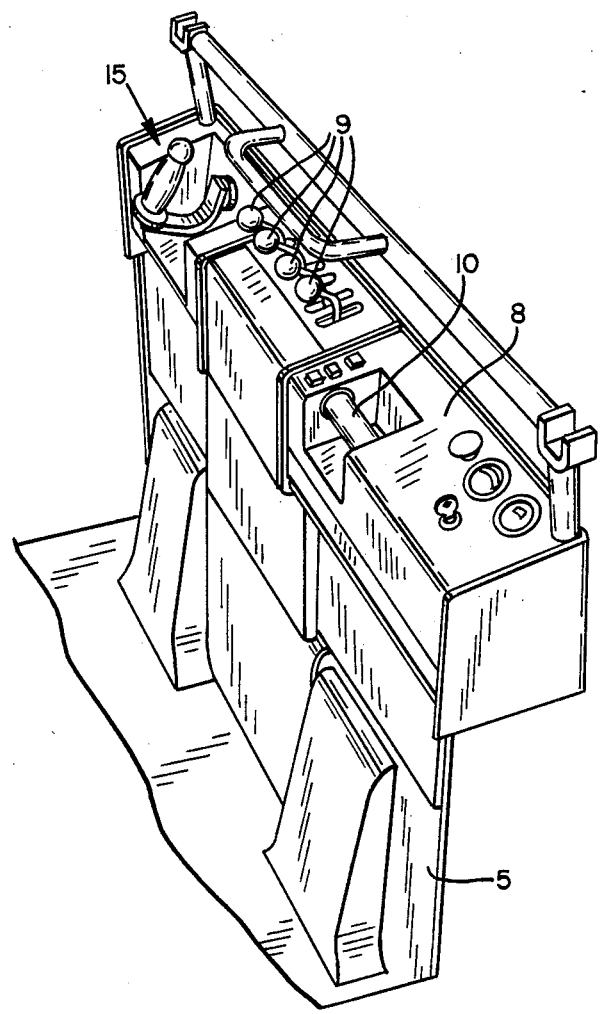
FIG. 2 is a perspective view of the rear of the front structure of the carriage of a lift truck and the control panel.

The improved view of the forks during load handling and the desire to "order pick," assemble a load on the forks from small packages manually removed from the racks, makes operation from a standing position desirable. The operator controls are positioned on a control panel 8, as illustrated in FIG. 2, on the front structure of the carriage and are arranged for use by standing or seated operator. A compact control panel is desirable as its size influences the size of the lift truck, the available room for the operator and the efficiency of order picking. A number of hand levers 9, positioned in the center of the control panel, are necessary for controlling the movement of the carriage and the independent movements of the forks. To the right of the hand levers is a combined speed and direction control 10 arranged for engagement by the operator's right hand. The handle 15 of the present invention is positioned to the left of the control panel for left hand use in steering the vehicle while the right hand is controlling speed and direction. The number of controls and the limited space of the control panel limit the space for mounting and operation of the controls. It will also be apparent that the operator, particularly when standing, must resist the forces due to changes in the speed and direction of the lift truck by exerting arm forces on the speed and direction control and steering control handle as both hands are simultaneously engaged with these controls when the lift truck is moving.

As shown in FIG. 3, the steering control handle 15 is generally of the shape of the letter "J", having a hand grip 16 attached to the longer substantially vertical portion, as oriented in FIG. 4; a second curved portion, having attached at one end the hand grip and at the other end a third portion, somewhat shorter than the hand grip, which is substantially vertical. The handle is rigidly affixed, at the third portion, to a handle shaft 18 which is journalled for rotation in a mounting structure 19. The steering control assembly, as illustrated in FIG. 3, is affixed to the control panel, by screws, not illustrated, engaging holes in the mounting structure, in a position such that the centerline of the handle shaft 18 is generally parallel to the forearm of the hand engaging in the hand grip.

The J-shaped handle affords a means of positioning the hand grip such that the centerline of the handle shaft 18, the axis about which the hand grip rotates, would, if extended, project through the lunate bone 20 as illustrated in FIG. 4, in the center of the wrist. To rotate the handle the operator exerts a force couple at the hand grip by rotation of the forearm. However, forces exerted on the hand grip, as the result of the operator's attempt to stabilize the body, are tension or compression forces acting through the lunate bone of the wrist in a direction which intersects the centerline of the handle shaft. These forces do not create a force coupled to rotate the hand grip.

The hand grip 16 is tilted, as illustrated in FIG. 3, from the normal to the centerline of the handle shaft with the free end of the hand grip being closer to the mounting structure than the attached end of the hand grip. This affords a comfortable position for the hand because the centerline of the hand's grip is a line approximately 15 degrees from the normal to a line drawn from the center of the lunate of the wrist through the joints of the middle finger. Rotating the upper end of the handle toward the mounting assembly approximately 8 degrees from the normal to the handle shaft centerline has been found to be the most comfortable position as the angle of the forearm changes between seated and standing positions.

The handle shaft 18 is journalled for rotation in the mounting structure 19 on bushing 21 which is pressed into a bore in the mounting structure. Forces applied to the hand grip in a direction perpendicular to the centerline of the handle shaft are reacted at the bushing. A shoulder 22, created by a change in diameter of the handle shaft, provides a means of reacting forces exerted parallel to the centerline of the handle shaft in the direction of the mounting structure. Forces acting in a direction which would withdraw the handle shaft from the mounting structure are reacted at the end of the bushing in contact with the arm 23 which is rigidly attached to the handle shaft by pin 24. Shims 25 provide a convenient method of controlling the extent of movement in the handle shaft in a direction parallel to the centerline of the shaft.

The arm 23 will also rotate with the handle shaft causing the reaction pin 26 affixed to the arm to move in an arc about the centerline of the handle shaft. The reaction pin 26 protrudes from the arm into the space between the free ends of a torsion spring 27, the coils of which surround the bushing. A similar reaction pin 28, affixed to the mounting structure also projects between the free ends of the torsion spring. As reaction pin 26 rotates with the arm one of the free ends of the spring will be carried with it while movement of the other free end will be blocked by reaction pin 28. As a result, the spring provides an elastic means to return the hand grip to the center position when released.

A potentiometer serves as a rotary transducer providing a variable signal to the lift truck's power steering system, not illustrated, as the control handle is rotated. The potentiometer comprises a potentiometer shaft 30 arranged for rotation in a body 31. The potentiometer shaft is inserted into a longitudinal bore in the end of the handle shaft 18 and is secured in longitudinal and rotational position by a set screw 32 threaded into a cross hole in the handle shaft. The potentiometer shaft and the body will thus move in both radial, to the handle shaft centerline, and longitudinal directions, as the handle shaft moves. To protect the fragile bearings of the potentiometer, the body is restrained only against rotation yet permitted to freely move in directions both radially from or parallel to the centerline of the handle shaft. Referring to FIG. 5, the body of the potentiometer 31 is provided with a threaded extension 33 concentric to the potentiometer shaft. A thin plate 34 having a hole at one end corresponding to the threaded extension is clamped to the potentiometer body by the nut 35. The plate extends radially from the centerline of the potentiometer shaft and has portions at the second end defining an elongated slot. The longer dimension of the elongated slot is aligned with the first and second ends of the plate and, as a result, radially from the potentiometer shaft. The shorter dimension of the elongated slot corresponds to the diameter of the shank of a capscrew 36 threaded into the mounting structure and locked in place by a jam nut 37. The capscrew, engaged in the slot, serves as a convenient anchor pin to resist rotation of the plate and, thus, the potentiometer body. The plate can, however, rotate around the centerline of the capscrew and translate in a direction perpendicular to the centerline of the potentiometer shaft to permit the body to conform to radial movements of the handle shaft. The length of the capscrew is selected to permit the plate to translate longitudinally on the capscrew to permit the body of the potentiometer to move parallel to the centerline of the handle shaft. Since the forces acting on the capscrew are limited to the frictional drag of the potentiometer bearings, forces resisting movement of the potentiometer body are virtually eliminated.

MODE OF OPERATION

To move the lift truck the operator engages and actuates the combined speed and direction control 10, as illustrated in FIG. 2, with the right hand and the steering control handle 15 with the left hand. To turn the lift truck to the left, the operator rotates the top of the hand grip 16 to the left by rotation of the forearm. To turn the lift truck to the right the top of the control handle is rotated to the right. Rotation of the control handle will cause the handle shaft 18 to rotate, about its centerline, and in turn rotate the shaft of the potentiometer 30. Since the body of the potentiometer 31 is restrained in rotation the potentiometer's shaft will rotate at the body and the electrical resistance will be varied. The lift truck's power steering system contains circuitry to sense the change in resistance of the potentiometer and signal the actuating means in the steering system to change the position of the steering wheels. If the operator should release the hand grip the elastic means in the hand grip will return the steering handle to the center position.

As the speed and direction of the lift truck change the forces of acceleration will act on the body of the operator to cause the body to move either fore or aft or laterally in the lift truck. To stabilize the body, the operator will exert force on the hand grip in a direction opposite that of the forces acting on the body. These forces will be either tension or compression forces acting through the bones of the wrist parallel to the centerline of the handle shaft or in a direction radial to the handle shaft. Since all of these forces must be reacted through the bones of the wrist the forces will intersect the centerline of the handle shaft 18 and will not cause a force couple which would rotate the handle shaft. As a result, forces exerted by the operator in stabilizing the body will be absorbed in the bushings of the handle shaft and will not cause unintended steering control movement.

These forces will, however, cause movement of the handle shaft which could damage the bearings of the rotary transducer utilized to sense handle position. However, the body of the potentiometer 31 is free to move in directions both radial to and parallel to the centerline of the handle shaft.

Although a specific embodiment of the invention has been shown and described, various changes and alterations might be made without departing from the spirit and broader aspects of the invention as set forth in the claims.

We claim:

1. A hand operated vehicle control comprising:
   (a) a hand grip arranged for engagement by a hand of an operator;
   (b) a mounting means supporting the hand grip for rotation about an axis extending through the lunate bone of the wrist of the hand engaging the hand grip in a direction generally parallel to the forearm; and
   (c) a means of communicating rotational movement of the handgrip to a vehicle system to be controlled.

2. The vehicle control of claim 1 wherein the means of communication of rotational movement of the hand grip comprises:
   (A) a transducer having a transducer shaft arranged for rotation in a transducer body;
   (B) a means for connecting the transducer shaft for rotation by the hand grip; and
   (C) a means for mounting the transducer body; permitting unrestrained movement, within the limits of movement of the transducer shaft, in directions parallel or radial to the axis of rotation of the hand grip while restraining rotation of the transducer body about said axis.

3. The vehicle control of claim 1 further comprising an elastic means to return the hand grip to the center of the extremes of its rotational positions.

4. The vehicle control of claim 1 wherein the mounting means comprises:
   (A) a mounting structure for attachment to the vehicle;
   (B) a handle shaft journalled for rotation in a mounting structure; and
   (C) a handle attached to the handle shaft at a first portion, projecting substantially perpendicular to the centerline of the handle shaft, and a second portion, projecting away from the mounting structure in a direction substantially parallel to the centerline of the handle shaft, to which is attached the hand grip such that the centerline of the handle shaft, if extended, would project through the center of the lunate bone of the wrist of the hand engaging the hand grip.

5. The vehicle control of claim 4 wherein the means of communication of the rotational movement of the hand grip comprises:
   (A) a rotary transducer having a transducer shaft rigidly attached to the handle shaft and mounted for rotation in a transducer body which is rigidly attached to;
   (B) the first end of a plate extending radially from the transducer shaft and having portions, in proximity to the second end, defining an elongated slot, the longer dimension of which is oriented perpendicular to the centerline of the transducer shaft and the shorter dimension of which corresponds to the diameter of;
   (C) an anchor pin rigidly attached to the support member and extending therefrom parallel to the transducer shaft to engage the plate at the elongated slot.

6. The vehicle control of claim 5 wherein the rotary transducer comprises a potentiometer.

7. A hand operated steering control for a vehicle comprising:
   (a) a handle having a general shape of a letter J; having a first portion forming a hand grip, a second portion connecting the first portion to a third portion which is shorter than the first portion and aligned generally parallel to said first portion, said third portion being; rigidly attached to;
   (b) a handle shaft; such that the centerline of the handle shaft, if extended, would be substantially parallel to a line extending through the joints of the middle finger to the center of the lunate bone of the wrist and would pass through the center of said lunate bone; the handle being journalled for rotation in;
   (c) a mounting structure attached to a vehicle frame and aligning the centerline of the handle shaft roughly parallel to the longitudinal centerline of the forearm;
   (d) an elastic means connected to the mounting structure and the handle shaft to return the handle shaft to a position midway between the extremes of its permitted rotational positions;

(e) a potentiometer shaft rigidly connected to the handle shaft and arranged for rotation in;

(f) a potentiometer body which is rigidly affixed to;

(g) one end of a plate projecting radially from the centerline of the potentiometer shaft and having portions at the second end forming an elongated slot, having a longer dimension which is aligned perpendicular to the centerline of the potentiometer shaft and a shorter dimension which corresponds to the diameter of;

(h) an anchor pin affixed to the mounting structure and projecting therefrom parallel to the centerline of the potentiometer shaft and extending through the elongated slot, and beyond, to engage the plate and prevent its rotation about the centerline of the potentiometer shaft.

* * * * *